(12) United States Patent
Sakatani

(10) Patent No.: US 6,847,732 B1
(45) Date of Patent: Jan. 25, 2005

(54) IMAGE ERROR DIFFUSION DEVICE WITH NOISE SUPERPOSITION

(75) Inventor: Kazuomi Sakatani, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 601 days.

(21) Appl. No.: 09/707,837

(22) Filed: Nov. 8, 2000

(30) Foreign Application Priority Data

Nov. 10, 1999 (JP) .......................... 11-319075

(51) Int. Cl.[7] .................................. G06K 9/00
(52) U.S. Cl. .................................... 382/167; 358/518
(58) Field of Search ............... 382/167, 251, 382/252, 270, 162, 275; 358/1.9, 3.03, 3.19, 465, 466, 3.06, 3.07, 3.08, 518, 529, 534

(56) References Cited

U.S. PATENT DOCUMENTS

| | | | | |
|---|---|---|---|---|
| 5,070,413 A | * | 12/1991 | Sullivan et al. | 358/3.03 |
| 5,225,915 A | * | 7/1993 | Ciccone et al. | 358/447 |
| 5,412,766 A | * | 5/1995 | Pietras et al. | 345/602 |
| 5,557,429 A | | 9/1996 | Hirose | |
| 5,805,738 A | * | 9/1998 | Kaburagi et al. | 382/251 |
| 5,809,177 A | * | 9/1998 | Metcalfe et al. | 382/251 |
| 5,880,857 A | * | 3/1999 | Shiau et al. | 358/3.03 |
| 5,892,851 A | * | 4/1999 | Nguyen | 382/252 |
| 6,002,804 A | * | 12/1999 | Bhaskar et al. | 382/252 |
| 6,134,351 A | * | 10/2000 | Waki et al. | 382/252 |
| 6,271,936 B1 | * | 8/2001 | Yu et al. | 358/3.04 |
| 6,483,606 B1 | * | 11/2002 | Klassen et al. | 358/1.9 |
| 6,543,870 B1 | * | 4/2003 | Kakutani | 347/15 |
| 6,671,068 B1 | * | 12/2003 | Chang et al. | 358/1.9 |
| 2002/0067510 A1 | * | 6/2002 | Kempf | 358/3.03 |

OTHER PUBLICATIONS

R.A. Ulichney, Dithering with blue noise, Proceedings of the IEEE, Jan. 1988, vol. 76, iss 1, p 56–79.*
Liu et al, Color halftoning: a non–separable model, Proceedings of the International Conference on Image Processing, Sep. 16–19, 1996, vol. 1, p 561–564.*
Lau et al, Green–noise digital halftoning, Proceedings of the IEEE, Dec. 1998, vol. 86, iss 12, p 2424–2444.*
Lau et al, Digital color halftoning with generalized error diffusion and multichannel green–noise masks, IEEE Transactions on Image Processing, May 2000, vol. 9, iss 5, p 923–935.*
Machine Translation of JP 10–155087, Jun. 9, 1998.*
Kishimoto et al, Improved Error Diffusion Modified with AM/FM Periodic Noise, International Conference on Digital Printing Technologies, Oct. 1999, p 366–369.*
R. Ulichney, Digital Halftoning, 1987, The MIT Press, selections from Ch 8 and Ch 9.*
Japanese Patent Abstract Publication No. 09–098290; Publication Date Apr. 8, 1997.
Japanese Patent Abstract Publication No. 09–307776; Publication Date Nov. 28, 1997.
Japanese Patent Abstract Publication No. 11–225273; Publication Date Aug. 17, 1999.
Japanese Patent Abstract Publication No. 06–133164, Publication Date May 13, 1994.

* cited by examiner

Primary Examiner—Yon J. Couso
(74) Attorney, Agent, or Firm—Morrison & Foerster LLP

(57) ABSTRACT

Disadvantages of conventional image processing devices using a vector error diffusion method include the generation of periodic texture noise of specific selected colors, resulting in marked reduction of graininess. A noise overlay unit is provided as a front stage of an error adding unit for adding error to input image data. If noise is superimposed on the L*a*b* color space or L*C*h color space, quantitative image evaluation matching human perception is possible, and overlay noise can be effectively optimized. If the total sum of the absolute amount of overlay noise is zero, the color tone of the entire image can be maintained.

9 Claims, 3 Drawing Sheets

IMAGE ERROR DIFFUSION DEVICE WITH NOISE SUPERPOSITION

This application claims priority to Japanese Patent Application No. 11-319055 filed Nov. 10, 1999, the entire content of which is hereby incorporated by reference.

BACKGROUND OF THE INVENTION

1. Field of the Invention

The present invention relates to an image processing method including error diffusion processing, and an image processing device using this method.

2. Description of the Related Art

Conventionally, when performing color correction to improve color reproducibility of a color image between input and output devices, such color correction is accomplished by methods using a color look-up table describing the correspondence between the color of the input and output image at each color point within a color space, methods which determine a corresponding color using a color look-up table only for suitably quantified color points when there are many such color points and by interpolation from a certain color point in a color look-up table for other color points, and conversion by calculation method based on masking theory.

When the number of reproducible color in the output device is less than the number of colors of the input device, and when the amount of data are reduced for saving and transfer, a decrease of color depth is performed. In binary image output devices such as color displays and color printers which form each color point by mixing two primary colors, the input image is broken down to primary color components of yellow Y, magenta M, cyan C, or yellow Y, magenta M, cyan C, black Bk, or red R, green G, blue B, and the respective color components are subjected to stimulated gradient expression processing, then the obtained binary images are combined and output.

This type of image processing uses an error diffusion process to diffuse errors generated when processing a target pixel to peripheral pixels. The colorimetric value of each output color is dependent on the device. When halftones are expressed using this same output device, the colors will appear different if the degree of dot overlay differs even though the dot generation rate of each color CMYBk is the same. However, in general color error diffusion processing, a device-dependent input signal is used and since the overlay of dots of the same pixel is not considered, it is difficult to improve color reproducibility.

A method for producing halftones in color vector space by error diffusion process is disclosed in Japanese Laid-Open Patent No. 9-307776. This method treats input image data as vectors, i.e., multidimensional quantities, not as unidimensional quantities. Although it is possible to use device-dependent color signals as color signals treated as vectors, in the following halftone process the input and output colors can be expected theoretically to match calorimetrically using an input image expressed with uniform color space such as XYZ, CIELAB and the like which are not device dependent, and using the XYZ value and CIELAB value of the colors outputtable by the output device known beforehand. The outputtable colors of binary image output devices are the eight colors of cyan, magenta, yellow, red, green, blue, white, and black, with white color often using the calorimetric value of the paper itself.

(1) The input color vector and the outputtable color vector are compared, and the color having the smallest vector of vector difference of the two colors is selected. That is, the outputtable color nearest the input color on the image space is selected.

(2) The error between the input color and output color generated by the color selection is calculated.

(3) The generated error in a processed pixel on the periphery of an unprocessed pixel is used for weighted addition to correct the input color. Thereafter, the process (1) is performed for the unprocessed pixels.

This method is referred to as a vector error diffusion method, which makes possible high fidelity color reproduction using comparatively few colors, and readily corresponds to the outputtable color of halftones and spot color addition.

Conventional image processing devices using a vector error diffusion method have certain disadvantages arising from the paucity selectable output colors, including texture noise wherein a certain specific selection color appears periodically, and markedly reduces the printed image (particularly graininess) of the image.

SUMMARY OF THE INVENTION

An object of the present invention is to provide an image processing device which reduces periodic noise of color components, and provides high quality output images.

In the present invention, a method of intentionally superimposing a noise on image data is applied to the error diffusion method, which is known as a method of reducing graininess.

These and other objects are attained by an image processing device, comprising an error adding unit for correcting the color of each pixel of an input image in accordance with the error data; an output color selector for converting the color corrected by the error adding unit to a single color selected from among a plurality of outputtable colors; an error calculator for generating data for diffusing the color error converted by the output color selector to pixels peripheral to a target pixel, and contributing these data to the error adding unit; and a noise overlay unit for superimposing noise on the input image and provided as a front stage to the error adding unit.

The invention itself, together with further objects and attendant advantages, will be best understood by reference to the following detailed description taken in conjunction with the accompanying drawings.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
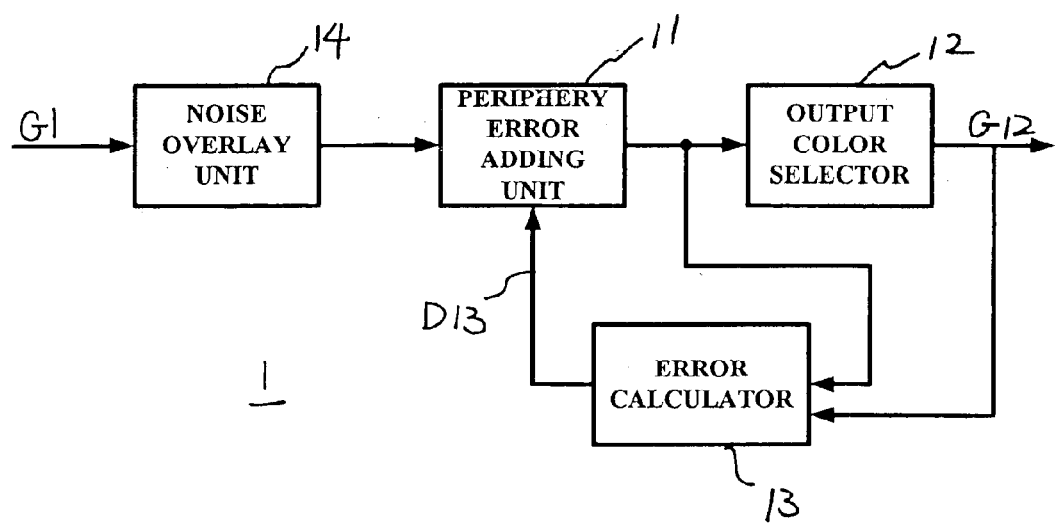
FIG. 1 is a block diagram showing an example of the structure of the image processing device.

FIG. 1 is a block diagram showing an example of the structure of the image processing device.

The image processing device 1 of FIG. 1 is used integrated with a computer system and color printer, and performs a decreasing process on color depth of input image data to be printed, displayed, or saved. In the image processing device 1, a periphery error adding unit 11, output color selector 12, and error calculator 13 are basic structural elements for color conversion using a vector error diffusion method. A noise overlay unit 14 is an added structural element characteristic of the present invention.

Image data are treated as CIELAB color space data from the time they are input to the image processing device 1 until output therefrom. Other multidimensional data in the color space such as XYZ color space, CIELCH color space and the like also may be used.

The input image G1 is processed pixel by pixel sequentially in the raster scan direction. The periphery error adding unit 11 corrects data of a target pixel of the input image G1 in accordance with the error data D13 from the error calculator 13. Error data D13 are weighted color conversion error of a previously processed pixel, and represent the data allocated to the target pixel among the distribution error allocated to the peripheral pixels. A weighted matrix (diffusion matrix) not shown in the drawing is used in error allocation, so as to allocate the error from a plurality of pixels within the matrix to the target pixel. Accordingly, the error data D13 is the total of distribution errors of a plurality of pixels. The error calculator 13 sequentially adds and stores the distribution error of each pixel. The output color selector 12 selects, pursuant with specific rules, one outputtable color for a target pixel the data of which has been corrected by the error adding unit 11. The output image G12 is reproduced using the selected output color. For example, an output device for image reproduction is a digital color printer which has eight outputtable colors (cyan (C), magenta (M), yellow (Y), red (R), green (G), blue (B), white (W), and black (Bk)). The previously mentioned specific rules are rules for selecting the color nearest the input color in the color space. More specifically, the rule simply compares the target color vector V and each output color vector Vi, and selects the color having the smallest difference vector |V-Vi|. In this rule, since the color of the pixels adjacent to the target pixel influence the region of the target pixel, the color actually perceived in the target pixel may differ from the output color vector Vi. When the perceived color is designated Vi', a rule selecting the color having the smallest difference vector |V-Vi'| is most appropriate.

A noise overlay unit 14 is provided in the image processing device 1 as a front stage of the peripheral error adding unit 11. The noise overlay unit 14 superimposes a noise component described later on the input image G1 to suppress the generation of biased texture of the color component. The graininess of the output image is improved without loss of color tone by selecting suitable noise.

Figure 2A:
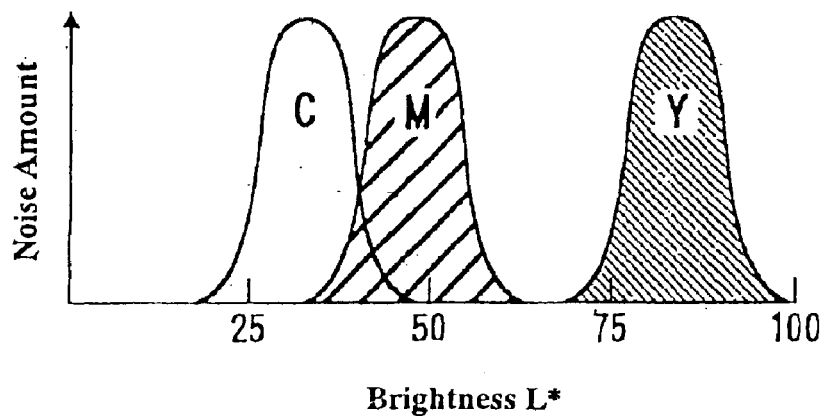
FIG. 2a through FIG. 2c show an example of intentionally superimposed noise.
Figure 2B:
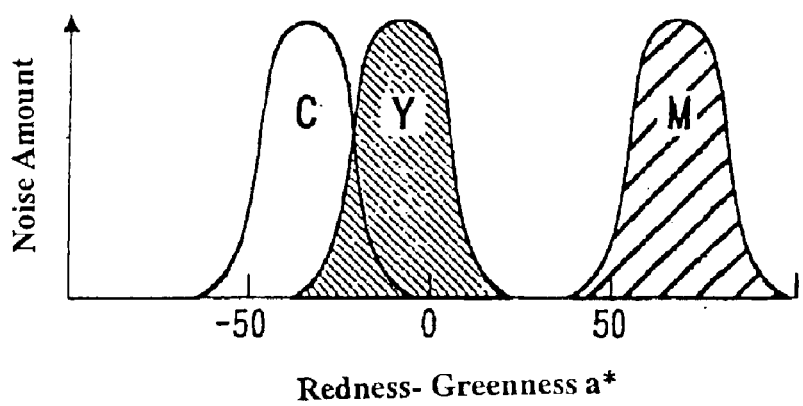
Figure 2C:
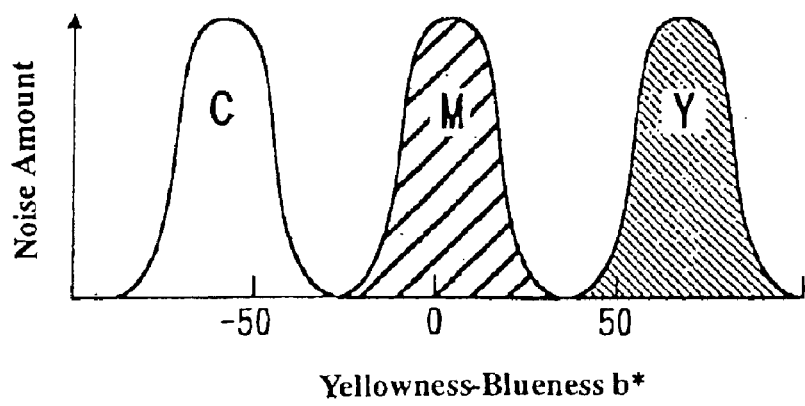

FIG. 2 shows an example of intentionally overlaid noise. In this example, the objects of noise overlay are the image data in the L*a*b* color space, and the outputtable colors are C, M, Y.

If the colorimetric value (L* value, a* value, b* value) of the respective outputtable colors C, M, Y are previously known, texture generation of the color component in a uniform patch image can be suppressed by superimposing Gaussian distribution noise having this value at its center. Furthermore, the color tone of the entire image is maintained if the total sum of the relative amount of overlay noise is zero relative to the colorimetric value of each outputtable color.

Figure 3A:
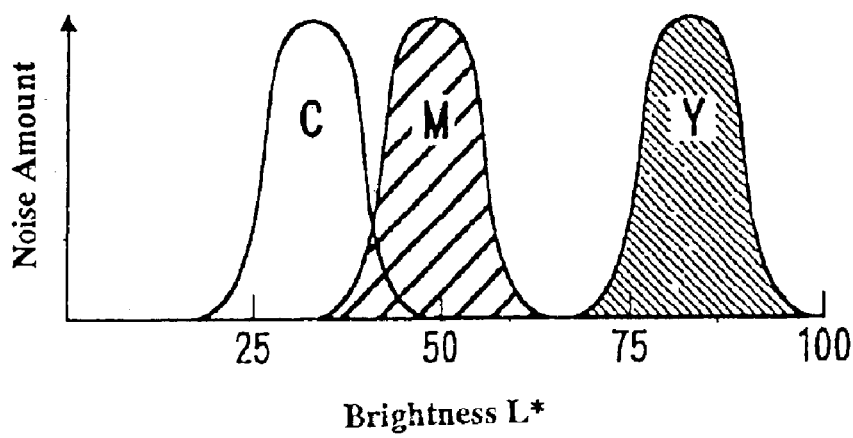
FIG. 3a through FIG. 3c show another example of intentionally superimposed noise.
Figure 3B:
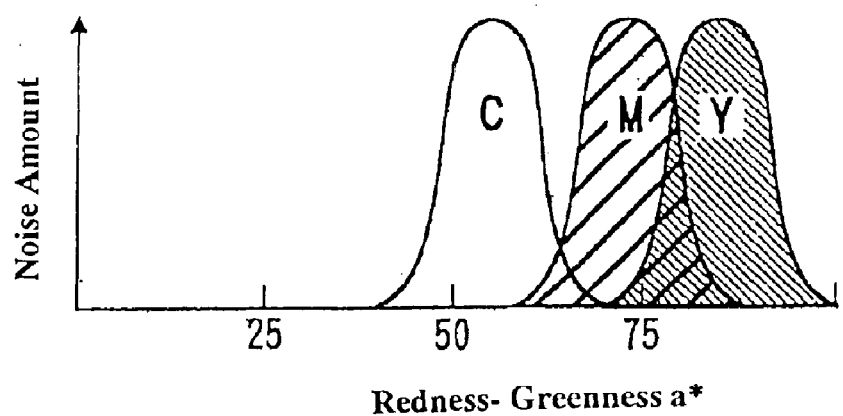
Figure 3C:
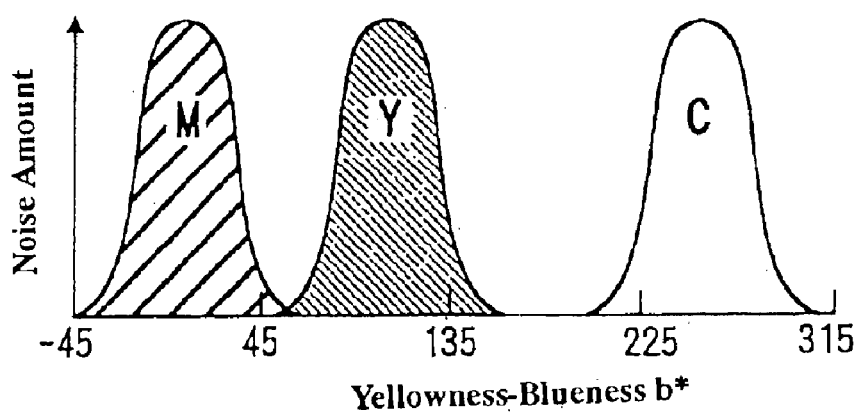

FIG. 3 shows another example of intentional overlay noise. In this example, the objects of noise overlay are the image data in the L*C*h color space, and the outputtable colors are C, M, Y.

In the case of the L*C*h color space also, the color tone of the entire image is maintained if the total sum of the relative amount of overlay noise is zero relative to the calorimetric value of each outputtable color.

Since the noise is overlaid in the L*a*b* color space or the L*C*h color space in the present embodiment, quantitative image quality evaluation matching human perception is possible, and the overlay noise can be effectively optimized.

In the above embodiment, the noise conditions (noise amount, distribution) may be modified in accordance with the resolution of the output device such as a printer, and the image attributes (text and photographic areas). The noise also may be modified for each pixel. The output color selection rule need not be a single, fixed rule, but rather a plurality of rules may be properly used in accordance with the content of the input image and the purpose of the output image and the like. According to the present embodiment described above, the color of an input image can be reproduced with high fidelity using a few colors, and periodic noise of color components is reduced so as to improve the quality of the output image.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An image processing apparatus, comprising:
   an error adding unit for correcting the color of each pixel of an input image in accordance with an error data;
   an output color selector for converting the color corrected by the error adding unit to a single color selected from among a plurality of outputtable colors of the image processing apparatus;
   an error calculator for generating the error data for diffusing the color error converted by the output color selector to pixels peripheral to a target pixel, and contributing the error data to the error adding unit; and
   a noise overlay unit for superimposing Gaussian distribution noise on the input image and provided as a front stage to the error adding unit.

2. An image processing apparatus according to claim 1, wherein color of each pixel of an input image is corrected by vector error diffusion method.

3. An image processing apparatus according to claim 1, wherein the noise is color data having relation to the colorimetric value of each outputtable color.

4. An image processing apparatus according to claim 1, wherein the noise is selected so that the total sum of the relative amount of overlay noise is zero relative to the calorimetric value of each outputtable color.

5. An image processing method, comprising:
   superimposing Gaussian distribution noise on an input image;
   correcting the color of each pixel of the noise superimposed input image in accordance with an error data;
   converting the corrected color to a single color selected from among a plurality of outputtable colors;
   generating the error data for diffusing the error generated when selecting the outputtable color of the target to pixels peripheral to the target pixel; and
   contributing the error data to said step of correcting.

6. An image processing apparatus, comprising:

correcting means for correcting the color of each pixel of an input image in accordance with an error data;

converting means for converting the color corrected by said correcting means to an outputtable color;

generating means for generating the error data for diffusing the color error converted by said converting means to pixels peripheral to a target pixel;

contributing means for contributing the error data to said correcting means; and superimposing means for superimposing Gaussian distribution noise on the input image and provided as a front stage to said correcting means.

7. An image processing apparatus, comprising:

superimposing means for superimposing Gaussian distribution noise on an input image, and correcting mean for correcting color of each pixel of the image on which noise is superimposed by vector error diffusion method.

8. An image processing apparatus according to claim 7, wherein the noise is color data having relation to the colorimetric value of each outputtable color of the image processing apparatus.

9. An image processing apparatus according to claim 7, wherein the noise is selected so that the total sum of the relative amount of overlay noise is zero relative to the colorimetric value of each outputtable color.

* * * * *